United States Patent
Skinner et al.

(10) Patent No.: US 10,721,205 B2
(45) Date of Patent: Jul. 21, 2020

(54) INTERACTIVE CONTENT IN A MESSAGING PLATFORM

(71) Applicant: Twitter, Inc., San Francisco, CA (US)

(72) Inventors: James Leslie Skinner, San Francisco, CA (US); James R. Buckhouse, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/241,981

(22) Filed: Jan. 7, 2019

(65) Prior Publication Data

US 2019/0158451 A1 May 23, 2019

Related U.S. Application Data

(63) Continuation of application No. 15/657,804, filed on Jul. 24, 2017, now Pat. No. 10,205,697, which is a continuation of application No. 15/370,851, filed on Dec. 6, 2016, now Pat. No. 9,749,283, which is a continuation of application No. 14/192,834, filed on Feb. 27, 2014, now Pat. No. 9,553,841.

(51) Int. Cl.
*G06F 15/16* (2006.01)
*H04L 12/58* (2006.01)
*H04L 12/18* (2006.01)

(52) U.S. Cl.
CPC .......... *H04L 51/32* (2013.01); *H04L 12/1895* (2013.01); *H04L 51/18* (2013.01)

(58) Field of Classification Search
CPC ...... H04L 51/32; H04L 51/18; H04L 12/1895
USPC ........................................ 709/206, 207, 223
See application file for complete search history.

(56) References Cited

U.S. PATENT DOCUMENTS

| | | | |
|---|---|---|---|
| 6,135,881 A | 10/2000 | Abbott et al. | |
| 8,705,195 B2 | 4/2014 | Lockton | |
| 9,117,197 B1 * | 8/2015 | Sharma | G06Q 10/10 |
| 9,553,841 B1 * | 1/2017 | Skinner | H04L 51/32 |
| 9,716,918 B1 | 7/2017 | Lockton et al. | |
| 9,749,283 B2 | 8/2017 | Skinner et al. | |
| 2010/0197278 A1 | 8/2010 | Anderl | |
| 2010/0332330 A1 * | 12/2010 | Goel | G06Q 30/02 |
| | | | 705/14.66 |
| 2011/0121938 A1 | 5/2011 | Slemmer et al. | |

(Continued)

OTHER PUBLICATIONS

United States Office Action, U.S. Appl. No. 14/192,834, dated Jan. 14, 2016, 8 pages.

(Continued)

*Primary Examiner* — Philip B Tran
(74) *Attorney, Agent, or Firm* — Fish & Richardson P.C.

(57) ABSTRACT

A messaging platform forms an interactive message with one or more components and broadcasts the interactive message to client devices associated with accounts. The interactive message has a plurality of states that update based on event data received from a content source. While the event is in progress, the messaging platform receives event data relating to the event and transitions to an updated state based on the received event data. When the interactive message transitions to the updated state, the messaging platform updates the interactive message broadcast to the client devices. The interactive message may include interactive components that accounts may use to perform various interactions with the event, the content source, or each other.

24 Claims, 7 Drawing Sheets

(56) References Cited

U.S. PATENT DOCUMENTS

| | | | |
|---|---|---|---|
| 2012/0239485 A1* | 9/2012 | Hu | G06Q 30/0207 |
| | | | 705/14.36 |
| 2013/0117108 A1* | 5/2013 | Spears | G06Q 30/0255 |
| | | | 705/14.53 |
| 2014/0095597 A1* | 4/2014 | McNeil | G06Q 50/01 |
| | | | 709/204 |
| 2014/0129605 A1 | 5/2014 | Huang | |
| 2014/0157148 A1 | 6/2014 | Joo et al. | |
| 2014/0229552 A1* | 8/2014 | Ranganath | H04L 51/32 |
| | | | 709/206 |
| 2018/0077106 A1 | 3/2018 | Skinner et al. | |

OTHER PUBLICATIONS

United States Office Action, U.S. Appl. No. 15/370,851, dated Feb. 28, 2017, 6 pages.

\* cited by examiner

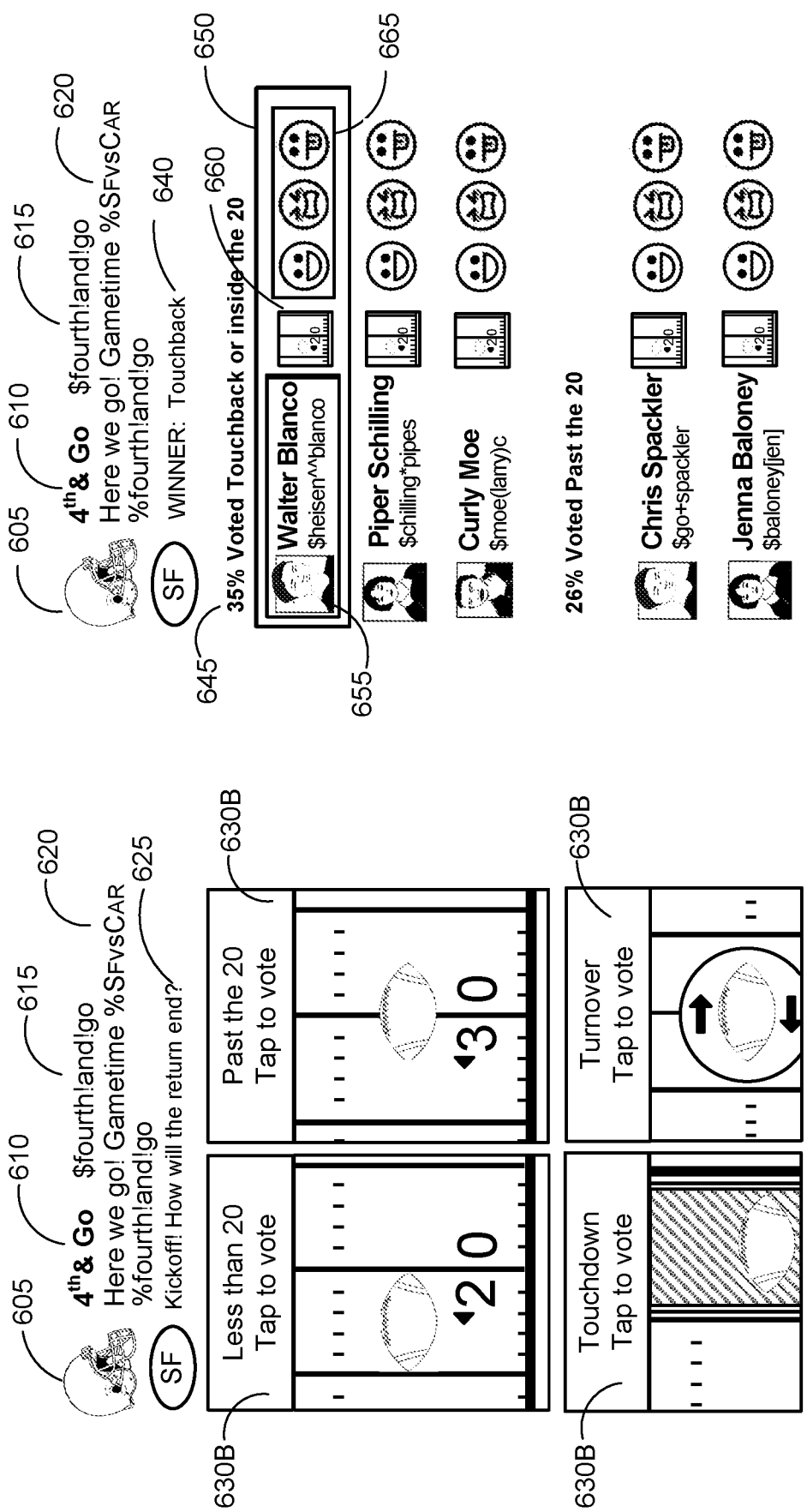

INTERACTIVE CONTENT IN A MESSAGING PLATFORM

CROSS REFERENCE TO RELATED APPLICATIONS

This application is a continuation of U.S. application Ser. No. 15/657,804, filed Jul. 24, 2017, which is a continuation of U.S. application Ser. No. 15/370,851, filed Dec. 6, 2016, now U.S. Pat. No. 9,749,283, which is a continuation of U.S. application Ser. No. 14/192,834, filed Feb. 27, 2014, now U.S. Pat. No. 9,553,841, all of which is incorporated by reference in its entirety.

BACKGROUND

Online messaging platforms provide an environment for sharing and discussing content. Accounts may discuss content posted by other accounts through social media content items (SMCIs). The content in a SMCI is static in that it does not change after the SMCI is authored. Although this property is suitable for many applications, static content may not accurately describe live events that are unfolding in real time. Static content in a SMCI may reflect out of date information, so the relevance of a SMCI diminishes over time. Additionally, SMCIs as a whole present a scattered picture of an event. A social media user seeking a wider perspective on an event can search for SMCIs about an event, but a search typically returns only a portion of SMCIs referring to an event.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 6C and 6D illustrate an example user interface for presenting an interactive message in two successive states, according to one embodiment.

DETAILED DESCRIPTION

FIGS. 1-7 and the following description relate to various embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In one example embodiment, a messaging platform creates and updates an interactive message having a plurality of states. The messaging platform receives a request from an account of an event moderator to initiate an interactive message. The request specifies a message type and a content source. The messaging platform forms the interactive message including a plurality of states associated with an event. The interactive message is structured according to a template retrieved based on the message type. The template has one or more components structured to present content relevant to the event. The messaging platform broadcasts the interactive message for presentation to users of receiving accounts by client devices.

While the event is in progress, the messaging platform receives event data relating to the event. The received event data are received from the content source. Based on the event data, the messaging platform transitions the interactive message to an updated state from the plurality of states. In response to transitioning to the updated state, the messaging platform updates the interactive message broadcast to the accounts. Updating the interactive message may include presenting the updates to users of accounts that have received the interactive message by updating a representation of the interactive message presented by a client device. It is noted that the disclosed embodiments include, without limitation, methods, systems, and computer-readable media for creating and updating the interactive message.

Messaging Environment

Figure 1:
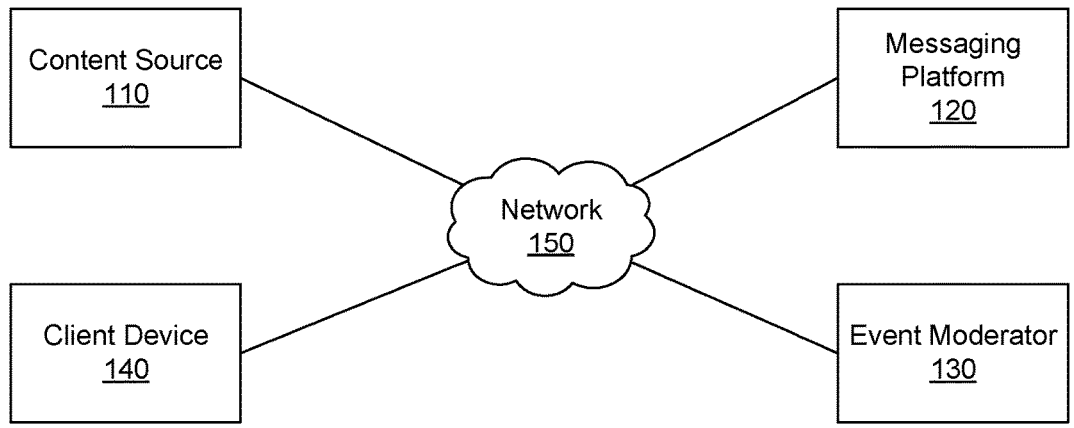
FIG. 1 illustrates connections among agents interacting in a messaging environment, according to one embodiment.

Referring now to FIG. 1, illustrated are connections among agents interacting in a messaging environment, according to one example embodiment. The agents include a content source 110, a messaging platform 120, an event moderator 130, a client device 140, and a network 150. It is noted that multiple instances of the disclosed agents may be present in various embodiments, and that references herein to an agent (e.g., a content source 110, an event moderator 130, a client device 140, et cetera) generally refer to one or more of the agents. In an alternative embodiment, the functionalities of multiple agents may be merged, modified, or split into a functionally equivalent set of agents.

To form an interactive message, the messaging platform 120 uses event data, which describe facets of an event (e.g., a sporting event, a race, an awards show, a political event, a news event, a musical concert, a fashion show, a contest, a live chat with a celebrity over the Internet). Event data may include any data gathered from an event including images, text, numerical data, and time-based media (TBM) content. Example text includes closed-captions, transcriptions of broadcast audio, and descriptions of the event. Numerical data can include manually input data and data from devices and sensors that transmit data. For example, event data from a sporting event include statistics from a scorekeeper recording the results of plays and data from sensors that monitor game participants and objects (e.g., radar that records a ball's position or speed, a Global Positioning System (GPS) sensor that tracks the position of a motor sports event participant, a physiological sensor on an event participant). TBM content has a time component and includes broadcast television, radio, videos, animations, audio files, and interactive media (e.g., a game, virtual reality, an interactive advertisement). Event data may be obtained from a variety of sources, such as local or network stores, as well as directly from sensors or capture devices such as cameras, video recorders, microphones, and live broadcasts. It is anticipated that other types of event data within the scope of the disclosed embodiments will be developed in the future (e.g., three-dimensional media).

A content source 110 disseminates event data from an event in progress over the network 150. The content source 110 may be an entity that organizes an event (e.g., a sports league, an industry association organizing an awards show), or an entity that distributes event data (e.g., a television network, a radio station, a news service, a website). The content source 110 captures event data and provides the event data in a suitable form to the agents (e.g., the messaging platform, the event moderator, et cetera). For example, the content source 110 streams video footage of a baseball game and uploads game statistics and photographs of players to a web server accessible by the agents substantially in real time. Real time communication can include, for example, receiving event data while the event is in progress and/or during concurrent sessions established with the messaging platform (e.g., a first session with a content source and a second session with a client device 140). The content source 110 may implement access restrictions such as granting certain agents access to certain event data. Multiple content sources 110 may disseminate event data about the same event. For example, a television network disseminates TBM content about a presidential debate, and the debate organizer disseminates event data indicating the current question or issue under discussion as well as remaining time allotments for speaking. The content source 110 may receive interaction aggregations from the messaging platform 120, which may be incorporated in event data. For example, a broadcast of a presidential debate incorporates an interaction aggregation summarizing sentiment towards the presidential candidates based on interactions with a corresponding interactive message.

The messaging platform 120 creates and distributes interactive messages based in part on event data received from one or more content sources 110. The messaging platform 120 may include components of a social networking service (SNS) such as a social network, forum, or user group. The messaging platform 120 enables accounts (also referred to as authors) to communicate and interact with other accounts through the messaging platform 120. An account may author or redistribute social media content items (SMCIs) such as interactive messages, posts, videos, photos, links, status updates, blog entries, profiles, and the like. An interactive message presents event data from an event and may also include author-created content. For example, an account redistributes an interactive message and includes an author reaction. An interactive message is associated with a plurality of states. Based on a present state, the interactive message may present different event data or other content.

The event moderator 130 initiates the interactive message. In one embodiment, the event moderator 130 selects a message type and an event to create an interactive message. The event moderator 130 configures the interactive message to present event data and to update in response to event data. Updating an interactive message includes transitioning between states of the interactive message and/or presenting different or more current event data. The event moderator 130 may manually update the interactive message as an alternative or supplement to automatic updates based on event data. The event moderator 130 may additionally add moderator content such as text, an image, or TBM content to an interactive message. For example, the event moderator 130 initiates an interactive message about a baseball game. The interactive message presents pitch selection and velocity (event data) and textual commentary submitted by the event moderator 130 (moderator content). The event moderator 130 may be an account of the messaging platform 120 or may be associated with a content source 110. For example, a television broadcaster initiates and maintains an interactive message in addition to broadcasting video footage of an event.

The client device 140 presents the interactive message to a user of a receiving account for subsequent interaction. Client devices 140 include mobile devices (e.g., smart phones, tablets, personal digital assistants, smart watches) and computers (e.g., desktops, laptops). Computers and mobile devices are described further with respect to FIG. 7. A client device 140 may be associated with one or more accounts of the messaging platform 120. As used herein, a client device 140 refers to the physical client device 140 as well any associated accounts, human users, and/or simulated human users of the client device 140.

The network 150 comprises components for transmitting information between agents using wireless and/or wired media. For example, a network includes wide-area and local-area networks such as electromagnetic broadcasting systems, satellite networks, cellular networks, fiber optic networks, cable networks, or the Internet. The network 160 may include multiple networks transmitting information with analog signals, digital signals, or a combination thereof. The network may include a content delivery network that distributes content using servers distributed across multiple data centers located in different geographical locations.

Messaging Platform

Figure 2:
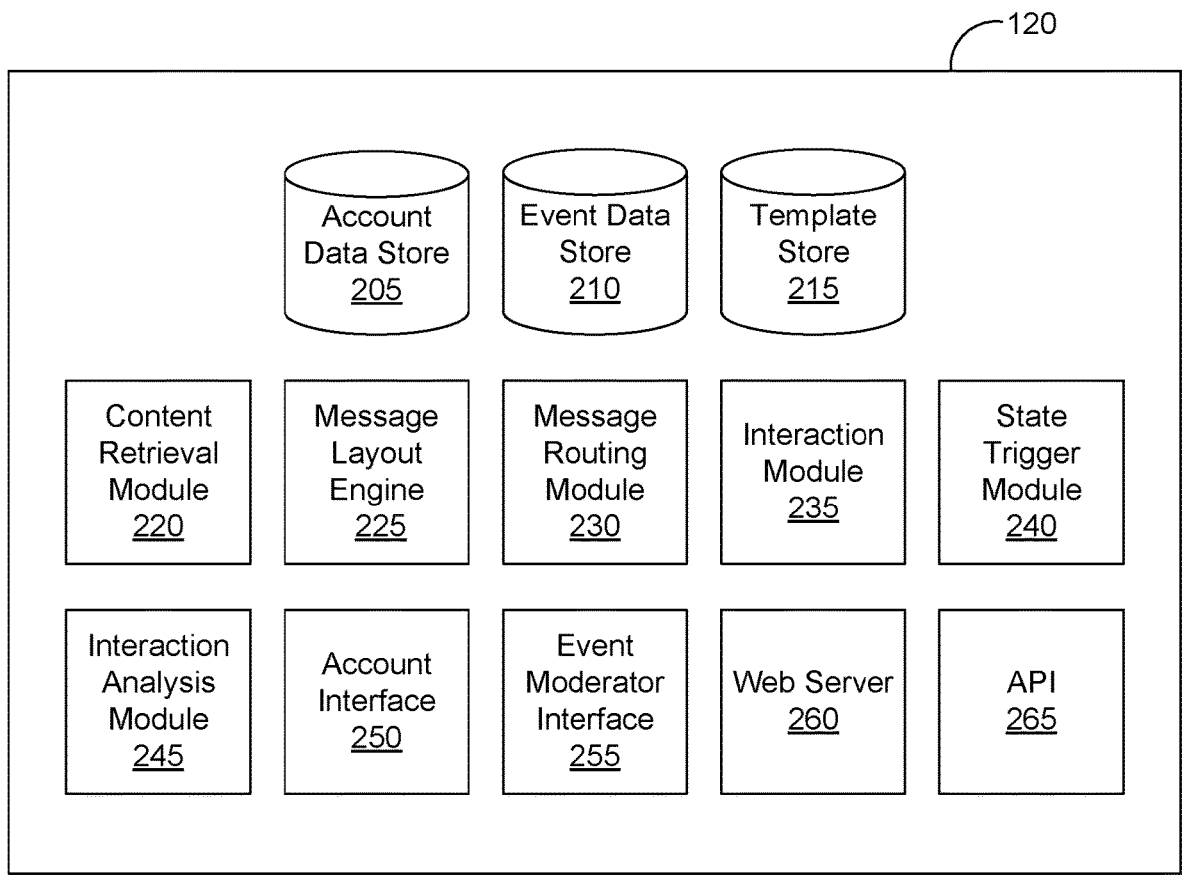
FIG. 2 illustrates example components of a messaging platform, according to one embodiment.

FIG. 2 illustrates example components of the messaging platform 120, according to one embodiment. The messaging platform 120 includes an account data store 205, an event data store 210, a template store 215, a content retrieval module 220, a message layout engine 225, a message routing module 230, an interaction module 235, a state trigger module 240, an interaction analysis module 245, an account interface 250, an event moderator interface 255, a web server 260, and an application programming interface (API) 265. For clarity of description, data store components are described first, interactive message modules are described second, user interface components are described third, and communication modules are described last.

Data Store Components

The account data store 205 stores information regarding accounts of the messaging platform 120. Examples of stored data include identifying information such as a user name, an account identifier, a password, one or more profile images, one or more user locations, an associated website, a biography, an email address, a phone number, content preferences, privacy settings, demographic information, account associations with other accounts of the message platform 120, and associations with other social networking systems.

Content preferences include interests or preferred topics or genres for the account, as explicitly provided by the user of an account associated with a client device 140, or as inferred from the account's authored SMCIs. Similarly, other information stored in the account data store may be received through a client device 140 and/or inferred by the messaging platform 130. In one embodiment, a content source 110 or an event moderator 130 has an account on the messaging platform 120, and thus has a corresponding entry in the account data store 205.

In one embodiment, the account data store 205 contains connection information forming a connection graph. The graph may contain unidirectional and/or bidirectional connections. For example, an account may "follow" a source account and is, therefore, subscribed to receive messages from the source account. In this example, graph data associated with the account indicates a unidirectional connection to the source account. As a second example, two accounts may connect with each other, forming a bidirectional connection. In this second example, each of the two accounts receives messages published by the other account.

The account data store 205 logs account actions on the messaging platform 120 including adding an association with another account, authoring a SMCI, sending a SMCI to another account, and reading a SMCI from another account. The account data store 205 logs a date and time corresponding to a logged action. Logged actions include interactions with interactive messages. These logged account actions may be used to determine relevance of an interactive message to an account. For example, an account authors a SMCI that includes content related to an event. The action is logged and the message routing module 230 infers that the event is relevant to the account. The message routing module 230 may identify the account to receive an interactive message related to the inferred event.

The event data store 210 contains event data that have been retrieved from or received from the content source 110. The event data store 210 contains event data and/or references to event data stored elsewhere (e.g., a content delivery network, the content source 110, a third-party server). The stored event data may include metadata about the event data. For example, metadata about TBM content may include a title, a description, the content source 110, and the associated event. Metadata about a sensor device may include the content source 110 as well as the sensor device type and location, for example.

The template store 215 includes one or more templates structured to visually and/or aurally present event data in an interactive message. A template specifies one or more components, as well as a visual and/or temporal arrangement of the components. A component may present event data associated with the interactive message, moderator content, or an interaction with the interactive message by an account. A template may be adapted for a particular type of client device 140 or group thereof based on display characteristics (e.g., aspect ratio, display area size, display resolution), computing characteristics (e.g., operating system type, browsing application type, processing speed, available memory), and aural characteristics (e.g., presence of audio playback devices, volume information). In other words, different client devices 140 may present a template differently to adapt to client device capabilities. In one embodiment, a template presents a different arrangement of components depending on a current state (e.g., most recently updated state) of the interactive message. Example components include a title, a description, a summary, a category, a byline, an image, text, TBM content, and an interactive component. Components that are associated with interactions are referred to herein as "interactive components."

Interactive Message Modules

The content retrieval module 220 communicates with the content source 110 to retrieve event data. The event data may be used by the message layout engine 225 and/or may be stored in the event data store 210. In one embodiment, the content retrieval module 220 requests updated event data from the content source 110. Alternatively or additionally, the content retrieval module 220 monitors the content source 110 for changes and retrieves updated event data substantially in real time. In one embodiment, the content retrieval module 220 receives updates sent by the event source 110 substantially in real time. The content retrieval module 220 updates event data in the event data store 210, which may be retrieved by the layout engine 225 or by a client device 140.

The message layout engine 225 forms an interactive message using a template retrieved from the template store 215. The formed interactive message is presented using the account interface 250. Based on a message type specified by the event moderator 130, the message layout engine 225 selects a template for presenting the interactive message. The message layout engine 225 maps event data, interactions, interaction aggregations, and/or moderator content onto components of the selected template. For example, an interactive message invites users of receiving accounts to predict the outcome of the next play in a football game. Some of the example components offer options to predict a play outcome and others indicate an account's last play prediction and the actual outcome. As another example, an interactive message covering a political speech includes components that present, to a user of a receiving account, supplementary statistics and evidence from the speaker's political party and/or components that present rebuttal arguments and statistics from a political party that opposes the speaker.

In one embodiment, the message layout engine 225 personalizes a layout for an account based on associations with other accounts retrieved from the account data store 205. For example, a template includes a social interaction component that presents interactions with the interactive message by other accounts associated with an account. In one embodiment, the message layout engine 225 associates a component with a reference to event data or moderator content, and a client device 140 retrieves the event data or moderator content for the component (e.g., from the event data store 210, from the content source 110, from an external server).

The message routing module 230 determines accounts to receive a broadcast interactive message based in part on information from the account data store 205. In one embodiment, the event moderator 130 specifies one or more accounts to receive an interactive message. Alternatively or additionally, the message routing module 230 retrieves accounts associated with an account of the event moderator 130 from the account data store 205. These associated accounts are selected to receive the interactive message. The message routing module 230 may select an account to receive the interactive message based on a stated or inferred preference of that account. For example, an account with a stated preference to receive SMCIs about movies is selected to receive an interactive message about an ongoing movie awards show. As another example, an account authors multiple SMCIs about a local baseball team. Based on the SMCIs, a preference for baseball is inferred, so the message routing module 230 selects the account to receive an interactive message associated with a game that the local baseball team is playing. In one embodiment, an account that receives a broadcast interactive message can direct the message routing module 230 to broadcast the interactive message to accounts associated with the receiving account or one or more accounts specified by the receiving account.

More broadly, the message routing module 230 determines accounts to receive messages broadcast or multicast through the messaging platform 120. In one embodiment, the account data store 205 contains connection information stored as graph data. When a sending account broadcasts a message through the messaging platform 120, the message routing module 230 identifies one or more recipient accounts based on the predefined graph relationships in the account data store. For example, a user of a sending account participates in an interactive message and opts to share the interactive message with followers of the sending account. In this example, the routing module 230 identifies recipient accounts to receive the interactive message. Hence, accounts besides the event moderator 130 can broadcast an interactive message in one embodiment.

The interaction module 235 handles interactions between a user of a receiving account and an interactive message. In one example embodiment, an interactive message contains one or more interactive components that a user of a receiving account may activate to interact with an interactive message. Interactions include an answer to an objective question about an ongoing, past, or future event, an answer to a subjective question about an ongoing, past, or future event, a reaction to another account's interaction, a transaction, an identification of event data in a component of the template, a reaction, or a command. Example objective questions include predicting an award winner at an awards show, a play's outcome in a sporting event, a winning team in a game, a winning participant in a race, or weather on a particular day (e.g., a measure of precipitation, a temperature). At some point during an event, the state trigger module 240 transitions to an updated state, and the interaction module 235 determines whether answers from various accounts to the objective question are correct or incorrect based on the updated state. The account interface 250 may update the interactive message presented by the client device 140 to indicate whether the user of the receiving account has answered the objective question correctly or incorrectly (e.g., a component of the interactive message indicates whether a user of a receiving account's prediction was vindicated). Example subjective questions include an expression of opinion, a rating of a media event, a selection of a favorite play at a sporting event, or a positive or negative reaction to a political candidate's speech.

In one embodiment, the interaction module 235 receives (through a client device 140) an identification of event data from a user of a receiving account. Using a client device 140, the user of the receiving account identifies event data in an interactive component by identifying event data (e.g., an object, a person, a segment of TBM content incorporated in another segment of TBM content), extracting a feature from event data, or associating supplemental information with event data. For example, a client device 140 of a receiving account presents an image of an athlete; the client device 140 then receives a selection indicating the portion of the image representing the athlete's face and an input identifying the athlete's name. As another example, a client device 140 presents a video of a race to a user of a receiving account; the client device 140 receives a selection of the portions of the video containing the race car as well as a textual input identifying the driver of the racecar or the racecar's team name. Similarly, a client device 140 may receive a location associated with an image or a video component from a user of a receiving account. Client devices 140 may receive inputs from users of receiving accounts to extract features such as the winning sail boat in a race or the official scoring of a baseball play. In one embodiment, a client device 140 presents an image or TBM media showing an object in a component, and the client device 140 receives supplemental information about the person or object. For example, a user of a receiving account provides (through a client device 140) supplemental information about an actress's birthday or a reference to a documentary about an actor's difficulties with hotel housekeeping staff. The interaction module 235 records event data received through interactions. Through interactive components that identify event data, a user of a receiving account may contribute event data in a similar manner to an event moderator 130.

In one embodiment, the interaction module 235 handles reactions to interactions. An example template presents a social interaction component next to a reaction component. Using a reaction component, a user of a receiving account can react to an interaction by another account through a client device 140. Example reactions include a unary reaction (e.g., a like, a favorite), a binary reaction (e.g., up-vote or down-vote, like or dislike), a multiple choice reaction (e.g., emoticons, adjectives), or a custom reaction (e.g., a text box, a user-submitted image, user-submitted TBM). For example, a client device 140 receives an emoticon input selected by a user of an account to taunt the user of another account about an incorrect prediction or to express shock at another account user's opinion of an actress's dress. The interaction module 235 records interactions and notifies an interacting account when another account reacts to the interacting account's interaction.

The interaction module 235 handles transactions such as a donation, sale, purchase, or wager. For example, an interactive message about a charity benefit concert invites a user of a receiving account to donate to the charity or buy memorabilia, or an interactive message about a horse race includes a component that sells a wager on the horse race to an account. Through a social interaction component, client devices 140 present an account's transaction interaction to users of other receiving accounts. The interaction module 235 includes handling of interactive message commands such as a start, pause, stop, rewind, or fast-forward command to control playback of TBM content (e.g., using a video or audio player associated with a component). Other example commands share an interactive message with one or more accounts associated with a client device's account (e.g., based on graph data or connection data from the account data store 205) or share an account's interaction with another account.

The interaction module 235 records interactions for use by the interaction analysis module 245. In one embodiment, the interaction module 235 collects interactions by various accounts and presents them in a social interaction component of a template presented by a client device 140. The interaction module 235 may select interactions to present to a user of a receiving account via a client device 140 according to accounts connected to the receiving account. Alternatively or additionally, the interaction module 235 selects interactions to present to a user of a receiving account (via a client device 140) based on other data retrieved from the account data store 205 such as geographic proximity or demographics, or based on information about the received interactions (e.g., time priority, response diversity).

The state trigger module 240 uses triggers such as event data, a SMCI, an interaction, and/or manual commands from an event moderator 130 to update a state associated with an interactive event. An interactive message has a plurality of states, which are predefined. The interactive message transitions from a current event state to an updated event state according to triggers associated with the current state (e.g., most recently updated state). The interactive message template updates in response to a state transition. For example, the components of the template presented to a user of a receiving account change, or the event data or content presented in a component changes. For example, an interactive message about a baseball game has an "at-bat" and a "big play" state. In the "at-bat" state, the template presents event data from pitch sensors, and includes interaction components prompting users of receiving accounts to predict the next pitch type and to transmit their selection to the messaging platform 120 through their client devices 140. When the content retrieval module 220 receives event data indicating that a batter has reached a base or scored, the state trigger module 240 transitions to the "big play" state, which includes a video player component that shows a replay of the base hit or score.

In one embodiment, the state trigger module 240 analyzes event data to extract features from images or TBM content. Generally, feature extraction recognizes a coherent portion (spatial or temporal) of an image or TBM content and/or links a recognized portion to a linguistic description. Feature extraction includes recognizing faces or objects, associating audio with an object in a video, speech to text processing, recognizing meaningful breakpoints in TBM content, simplifying a video sequence to a textual description of events, or inferring numerical data about an object from a video. For example, feature extraction identifies when a football play begins and ends, the position of the ball to start the next play, the team with possession to start the next play, or whether any points were scored. Based on recognizing that a play has occurred, the state trigger module 240 transitions between states in a related interactive message. As another example, the state transition module 240 recognizes, from a video feed of a concurrent broadcast, an actor or actress arriving at a movie awards show and transitions to a state specific to the recognized actor or actress.

In one embodiment, the state trigger module 240 analyzes SMCIs received by the message platform 120 to trigger a state transition. The state trigger module 240 infers event data from received SMCIs based on textual linguistic analysis and/or feature extraction of images or TBM content in a SMCI. Inferring event data may rely on statistical methods that account for the number of accounts mentioning similar combinations of words and/or trustworthiness of accounts (e.g., based on an institutional affiliation). Inferring event data may include analysis of data from the account data store 205 and/or correlation with event data. For example, the state trigger module 240 infers that a musician has won an award at an awards show based on SMCIs received substantially in real time about the award and the musician. The state trigger module 240 weights a SMCI associated with the musician's record label or the award granting institution higher than it weights a SMCI from a typical account. As another example, the state trigger module 240 recognizes a score in a game (e.g., a goal in a soccer game) based on category tags in SMCIs. In this example, the recognized goal triggers a state change in an interactive message about the soccer game.

In one embodiment, the state trigger module 240 receives event data from the event moderator 130 that indicate the updated state for the next transition. In other words, the event moderator 130 manually instructs the state trigger module 240 to transition the interactive message to a specified updated state. In one embodiment, the state trigger module 240 uses event data gathered from interactions with an interactive message. Based on an analysis of an interactive message component that prompt users of receiving accounts to identify event data in a component, the state trigger module 240 identifies a trigger to transition between states. The techniques used may be similar to those used to infer event data from SMCIs.

The interaction analysis module 245 creates interaction aggregations from received interactions. An interaction aggregation is a textual, graphical (e.g., a bar graph, a pie chart), numerical, and/or TBM content summary of interactions. For example, the interaction analysis module 245 computes percentage responses of accounts that like and dislike a decision to award a painter in a concurrently broadcast art awards ceremony. Interactions may be aggregated according to demographic, geographic, or other information from the account data store 205. For example, an interactive message that asks users of receiving accounts to predict the outcome of a game between two sports teams. The interaction analysis module 245 may create a graphical representation of responses overlaid on a map. For example, an image demonstrates interactive responses over time, or an animation presents interactive response over time.

In one embodiment, a component of an interactive message template may present the interaction aggregation. An interaction aggregation may include data from a subset of accounts on the messaging platform 120 such as other accounts associated with an account or accounts that share a characteristic with an account (e.g., geographic, demographic, other information from the account data store 205). For example, a template presents an aggregation interaction based on accounts that went to the same undergraduate institution as the account associated with a viewing client device 140.

User Interface Components

The account interface 250 is structured to present the components of a template as well as event data, moderator content, interactions, or interaction aggregations mapped to the components by the message layout engine 225. One embodiment of the account interface 250 is described with respect to FIGS. 6A-6C.

In one embodiment, the account interface 250 presents interactions recorded by the interaction module 235 to users of receiving accounts as part of an interactive message. The message routing module 230 may identify one or more accounts of interest to a receiving account based on graph data and connections. For example, an interface component presents, to the user of a receiving account, interactions of accounts that the receiving account is subscribed to. As a more specific example, the account interface 250 presents donations made by accounts a receiving account is subscribed to. The message routing module 230 may identify accounts to present based on an analysis of graph data (e.g., common subscriptions and common subscribers between the presented account and the receiving account) or an analysis of logged account actions (e.g., number and type of actions with the presented account). In one embodiment, the message routing module 230 may filter accounts that a receiving account is subscribed to for accounts that have interacted with the interactive message. The remaining accounts are scored based on the receiving account and ranked; top-ranking accounts are selected for presentation in an interactive message component to the user of the receiving account.

The event moderator interface 255 is structured to present an interface for an event moderator 130 to initiate an interactive message. In one embodiment, the event moderator interface 255 includes a plurality of prebuilt templates structured for a class of events. Alternatively or additionally, an event moderator 130 may select and/or arrange components to create or edit a template. The event moderator 130 may select event data from a content source 110 to associate with components of a template. For example, an event moderator 130 selects event data such as an image that a first component presents regardless of the state, and the event moderator 130 selects event data (e.g., statistics) that a second component presents depending on the most recently updated state of the interactive message.

Communication Modules

The web server 260 links the messaging platform 120 to the network 150 and other agents coupled thereto, and is one means for doing so. The web server 260 may include messaging functionality for receiving and routing data between the agents. The web server 260 serves web pages, as well as other web related content, such as Java, Flash, and so forth. Example web pages are represented using Hyper-Text Markup Language (HTML), Extensible Markup Language (XML), JavaScript Object Notation (JSON), and/or PHP: Hypertext Preprocessor (PHP).

The API 265, in conjunction with web server 260, allows one or more external entities to access information from the messaging platform 120. The web server 260 may also allow external entities to send information to and/or receive information from the messaging platform 120 through the API 265. For example, an external entity sends an API request to the messaging platform 120 via the network 150 and the web server 260 receives the API request. The web server 260 processes the request by calling an API 265 associated with the API request to generate an appropriate response, which the web server 260 communicates to the external entity (e.g., an application on the client device 140) via the network 150.

Interactive Message Creation

Figure 3:
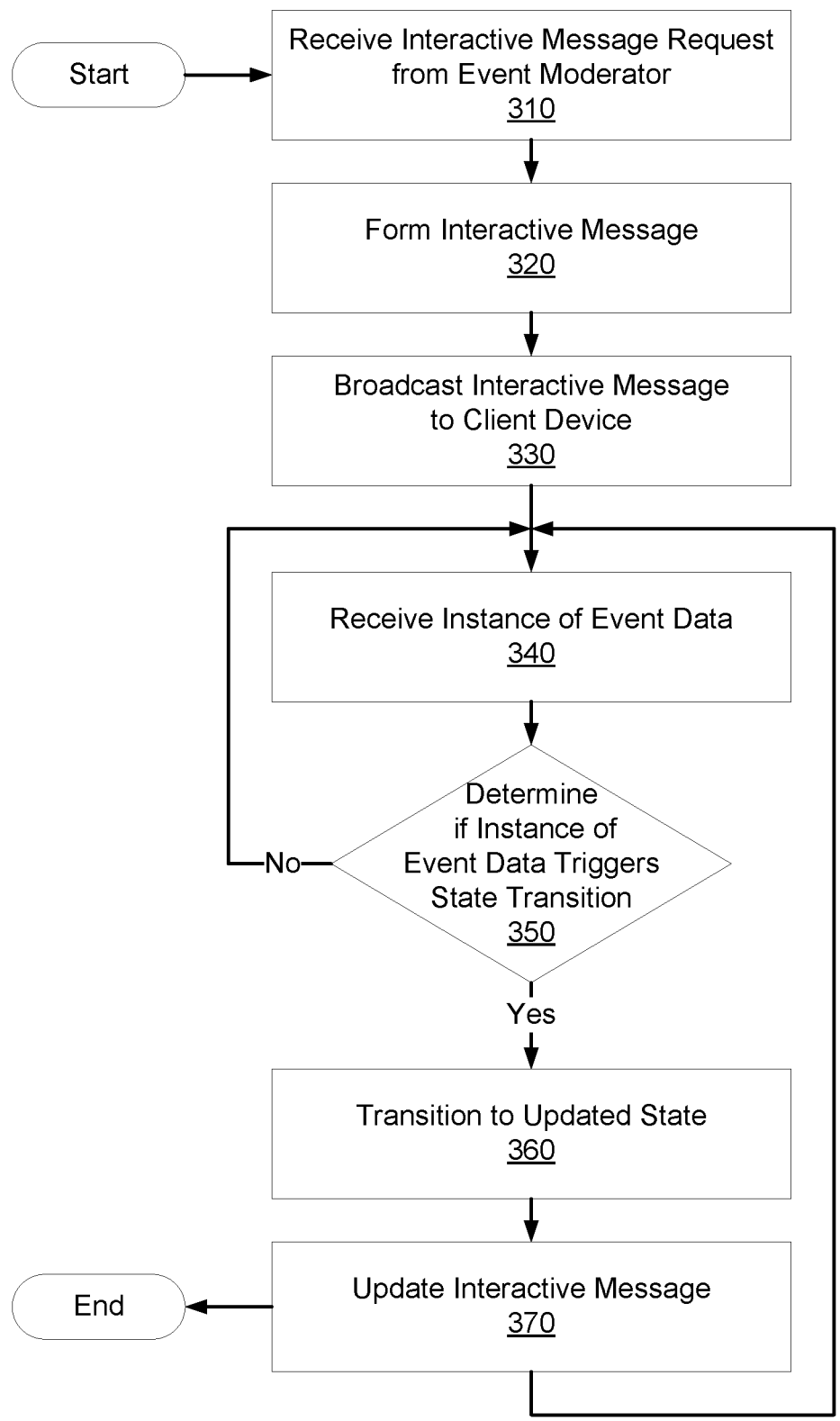
FIG. 3 illustrates a flowchart of an example process for creating and updating an interactive message, according to one embodiment.

FIG. 3 illustrates a flowchart of an example process for creating and updating an interactive message, according to one example embodiment. To begin the process, the web server 260 or the API 265 receives 310 an interactive message request from an event moderator 130. The request specifies a message type and at least one content source 110. The message layout engine 225 forms 320 an interactive message comprising a plurality of states associated with an event. The specified content source 110 corresponds to the event that an interactive message covers. The message layout engine 225 structures the interactive message according to a template retrieved from the template store 215. The selection of the retrieved template depends on the specified message type, and the template comprises one or more components. Forming the interactive message comprises associating event data received by the content retrieval module 220 with one or more components of the template.

The message routing module 230 selects one or more accounts to receive a broadcasted interactive message. The messaging platform 120 broadcasts 330 the interactive message for presentation to users of the selected accounts using client devices 140. In one embodiment, broadcasting an interactive message includes making the interactive message available on the web server 260 or through the API 265 to accounts on the messaging platform 120, including accounts not selected by the message routing module 230 to receive the interactive message. For example, the interactive message appears in related search results and/or is accessible through a webpage. As another example, an application on a client device 140 accesses the interactive message through the API 265. A "broadcast" SMCI may be received or accessed by all accounts, a subset of accounts chosen by the event moderator 130, and/or a subset of accounts selected by the message routing module 230.

While the event is in progress, the content retrieval module 220 receives 340 one or more instances of event data relating to the event. In one embodiment, the one or more instances of event data are received substantially in real time from the content source 110. The state trigger module 240 determines 350 if the received one or more instances of event data trigger a state transition. If the one or more instances of event data trigger a state transition, the state trigger module 240 also determines an updated state and transitions 360 the interactive message to that updated state 360. If the received one or more instances of event data do not trigger a state transition, the messaging platform waits to receive 340 and evaluate additional event data. In response to transitioning to the updated state, the content retrieval module 220 updates 370 the interactive message broadcast to the plurality of accounts. For example, the content retrieval module 220 pushes event data related to updated event components of an interactive event template presented by the client devices 140.

In one embodiment, the state trigger module 240 uses the messaging platform 120 as a content source 110. To transition 360 the state, the content retrieval module 220 obtains a plurality of SMCIs that include content such as text, an image, TBM content, and/or a tag. The state trigger module 240 determines the updated state based, at least in part, on an analysis of the content of the plurality of SMCIs. Alternatively or additionally, the interactive message's event is associated with concurrently broadcast content and the content retrieval module receives 340 event data comprising the concurrently broadcast content. The state transition module 240 determines the updated state based on, at least in part, features extracted from the concurrently broadcast content. In one embodiment, the content retrieval module 220 receives 340 an instance of event data from the event moderator 130. The received instance of event data directly indicates the updated state for a next transition.

The messaging platform repeatedly receives 340 event data, determines 350 if the event data trigger a state transition, transitions 360 to the updated state, and updates 370 the interactive message while the event is in progress. An event is in progress while the corresponding one or more content sources 110 produce or transmit updated event data. For example, a content source 110 about a football game transmits updates before the game (e.g., injury reports, pregame interviews), during the game (e.g., broadcast footage, play results, player statistics), and after the game (e.g., fan reactions, player interviews), so the event is in progress during all of these time periods. If no further event data are received 340, then the process ends after updating 370 the interactive message.

Interactions with an Interactive Message

Figure 4:
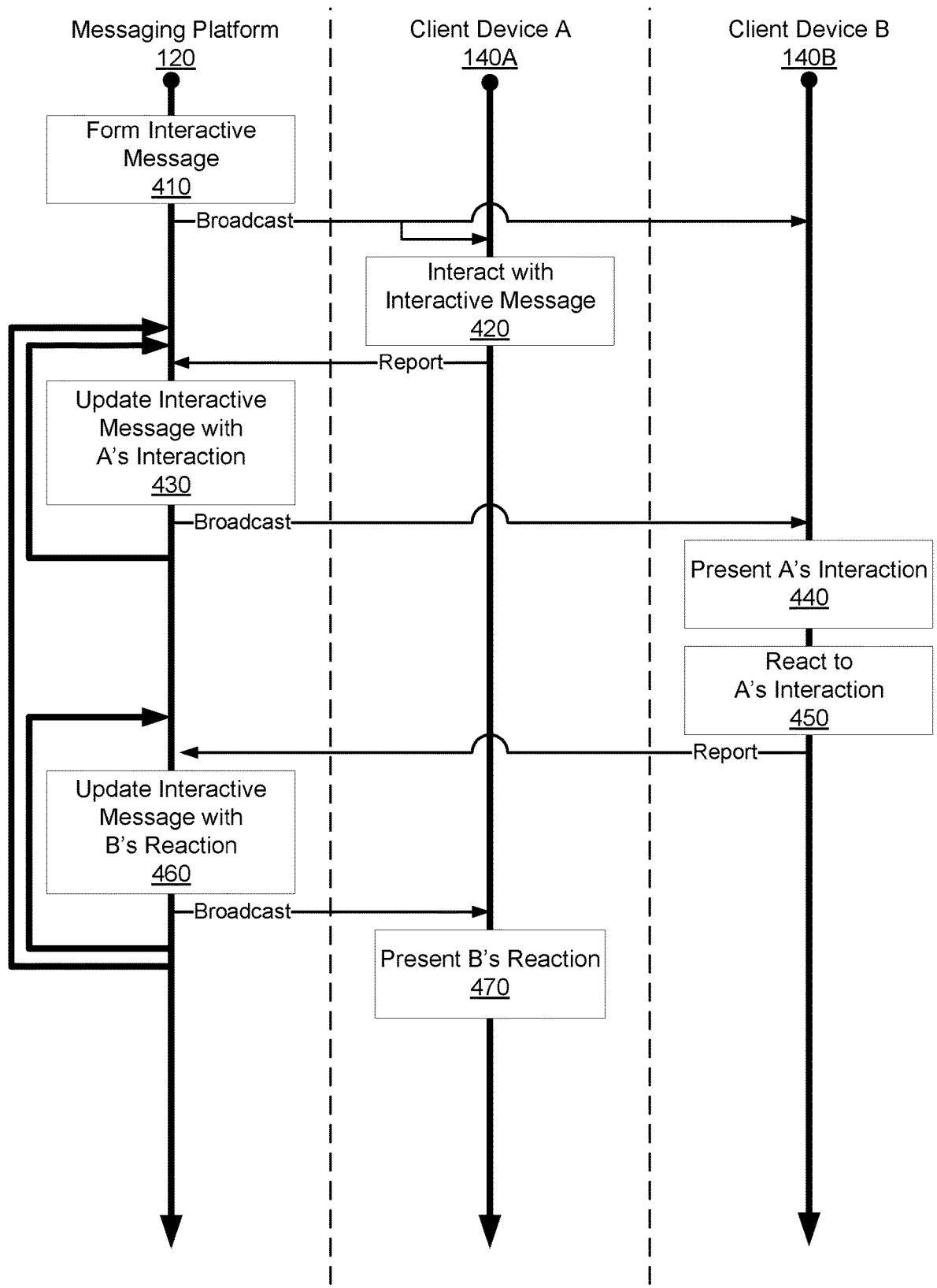
FIG. 4 illustrates interactions between agents of the messaging environment and an interactive message, according to one embodiment.

FIG. 4 illustrates interactions between agents of the messaging environment and an interactive message, according to one embodiment. The message layout engine 225 forms 410 an interactive message, and the message routing module 230 broadcasts the interactive message to client devices 140A and 140B. In the illustrated embodiment, the message layout engine 225 forms 410 the interactive message using a template that comprises one or more interactive components. The user of an interacting account, which has received the interactive message, interacts 420 (via the client device 140A) with an interactive component of the broadcast interactive message and reports to the interaction to the messaging platform 120. The interaction module 235 receives the interaction associated with the interacting account and records the interaction. The message layout engine 225 updates 430 the interactive message with the user of the interacting account's interaction by associating the received interaction with a social interaction component of the interactive message's template. The messaging platform 120 broadcasts the update to accounts via the client devices 140, including client device 140B. The messaging platform may receive a plurality of interactions from a plurality of client devices 140, which are also associated with the social interaction component structured to present the plurality of interactions.

As illustrated, client device 140B receives the broadcast interaction and presents 440 the interacting user's interaction to a user of a reacting account. The interaction is presented through a social interaction component along with interactions from other accounts that may have been received. In one embodiment, the interactive message includes interaction components that support reactions. The user of the reacting account, reacts 450 (using client device 140B) to an interaction from the interacting user of client device 140A and reports the reaction to the messaging platform 120, similar to reporting for other interactions. The interaction module 235 records the reacting account's reaction to the interaction from the interacting account. The message layout engine 225 updates 460 the social interaction component of the interactive message to present the reaction to the user of the interacting account. The messaging platform 120 broadcasts the update to client devices 140, including the client device 140A of the interactive account. The message platform may receive a plurality of reactions from a plurality of client devices 140 to one or more interactions presented in a social interaction component. The client device 140A presents 370 the reaction from the reacting account to the user of the interacting account in the updated social interaction component.

Aggregation of Interactions with an Interactive Message

Figure 5:
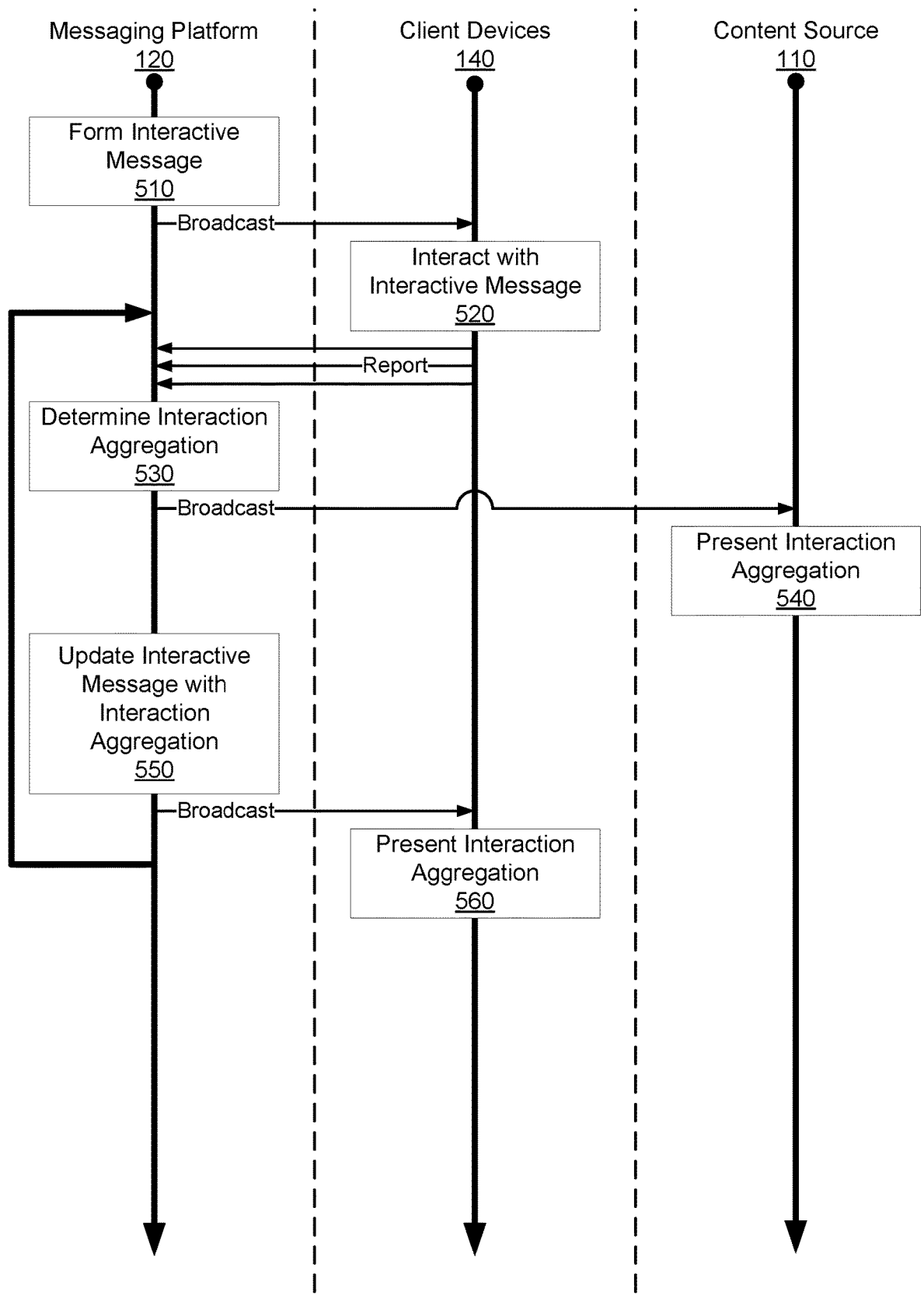
FIG. 5 illustrates example interactions among agents for creating and distributing an interaction aggregation, according to one embodiment.

FIG. 5 illustrates example interactions among the messaging platform 120, a plurality of client devices 140, and a content source 110. The agents create and distribute an interaction aggregation, according to one embodiment. In one embodiment, the message layout engine forms 510 an interactive message and broadcasts the interactive message to a plurality of accounts associated with client devices 140. Users of the receiving accounts interact 520 with the interactive message, and their client devices 140 report the plurality of interactions to the interaction module 235. Based on the received plurality of interactions, the interaction analysis module 245 determines 530 an interaction aggregation. The message layout engine 225 associates the interaction aggregation with a component of the template structured to present the interaction aggregation.

In one embodiment, the message routing module 230 broadcasts the interaction aggregation to a content source 110, which presents 540 the interaction aggregation through broadcast or multicast media. The content source 110 may be a provider of concurrently broadcast content that incorporates the broadcast interaction aggregation from the messaging platform 120 into a televised broadcast. For example, an interactive message includes an objective question about which team will win a football game. In this example, a determined interaction aggregation indicates percentages of accounts that have picked each team. These percentages are incorporated into a broadcast telecast of the game in the form of a graph indicating predictions by the users of the receiving accounts about the game winner over the course of the football game.

Alternatively or additionally, the message layout engine 225 updates 550 the interactive message with the interaction aggregation. For example, a component structured to present the interaction aggregation to a user of a receiving account is updated. The message routing module 230 broadcasts the interaction aggregation to one or more of the plurality of client devices 140, which present 560 the interaction aggregation to a plurality of users of receiving accounts. For example, a client device 140 indicates aggregate predictions from accounts associated with the receiving account of the user of the client device 140.

Example User Interface

Figure 6B:
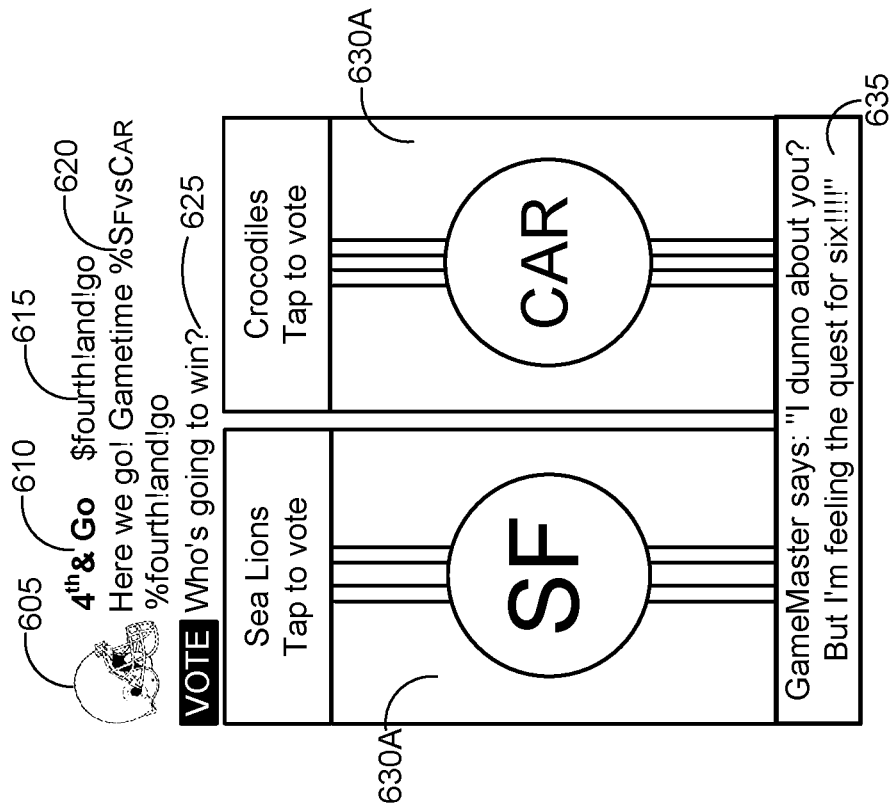
FIGS. 6A and 6B illustrate an example user interface for presenting a SMCI containing an interactive message in reduced form and expanded form, respectively, according to one embodiment.
Figure 6A:
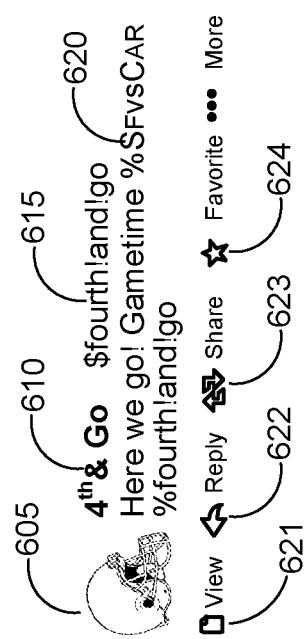

FIGS. 6A and 6B illustrate an example user interface for presenting a SMCI containing an interactive message in reduced form and expanded form, respectively, according to one embodiment. The example user interface is presented on a client device 140 structured to present one or more SMCIs through the account interface 250 to a user of a receiving account. The SMCI containing the interactive message includes components such as a profile image 605, a user name 610, an account identifier 615, SMCI content 620, a view button 621, a reply button 622, a share button 623, and a favorite button 624. The profile image 605, user name 610, and account identifier 615 are associated with an account of the event moderator 130 that initiated the interactive message. The event moderator 130 selects a profile image 605 and user name 610 when registering an account with the messaging platform 120. Users of accounts may use the account identifier 615 to send SMCIs to the event moderator 130, find SMCIs authored by the event moderator 130, or to navigate to a webpage associated with the account of the event moderator 130. The SMCI presents SMCI content 620 describing the interactive message and authored by the event moderator 130.

To view the interactive message, in one embodiment, a user of the receiving account selects the view button 621, which presents the expanded form of the interactive message. The reduced form of the interactive message may include standard functionality associated with a SMCI. For example, a user of a receiving account may use the reply button 622 to broadcast an SMCI to the event moderator 130, or use the share button 623 to broadcast the SMCI to other accounts associated with the receiving account using the message routing module 230. The user of the receiving account may mark the SMCI as a favorite to add the SMCI to a collection of favorite SMCIs and/or to provide feedback to the event moderator 130.

Turning to FIG. 6B, illustrated is the SMCI of FIG. 6A in an expanded form to present the contained interactive message. In the expanded form, the SMCI includes additional components such as a prompt interactive component 625, response interactive components 630A, and moderator content 635. The response interaction components (generally 630) may be divided into two or more selectable regions within the user interface. Each region may correspond with a pre-specified response that is recorded if selected. The prompt interactive component 625 presents an objective question to the user of a receiving account, who may make a prediction about which football team is going to win the game using the response interactive components 630A (e.g., select one side or the other of the response interactive component 630A). The interaction module 235 records interactions between the user of the receiving account and the response interactive components 630A. Moderator content 635 may indicate an event moderator's commentary on the event or instructions for interacting with the interactive message.

FIGS. 6C and 6D illustrate an example user interface for presenting an interactive message in two successive states, according to one embodiment. In an initial state, illustrated in the example user interface of FIG. 6C, the interactive message presents an arrangement of components including a profile image 605, a user name 610, an account identifier 615, SMCI content 620, a prompt interactive component 625, and response interactive components 630B. The arrangement of components corresponds to an example pre-kickoff state that prompts the user of a receiving account to predict the result of a kickoff. Using the response interactive components 630B, the users of receiving accounts can predict the result of a kickoff play.

Based on event data from a content source 110, the state trigger module 240 triggers the interactive message to transition to an updated state. A user interface corresponding to the updated state is illustrated in FIG. 6D. In the updated state, the interactive message presents an arrangement of components including the profile image 605, the user name 610, the account identifier 615, the SMCI content 620, a result indicator 640, an interaction aggregation 645, a social interaction component 650, account identifiers 655, a prediction 660, and reactions 665. The arrangement of components corresponds to an example post-kickoff state that indicates the result of the kickoff and other accounts' predictions for the result of the kickoff. The result indicator 640 indicates the result of the previous play based on event data from the content retrieval module 220. The interaction aggregation 645 indicates a percentage of accounts that predicted a given outcome as determined by the interaction analysis module 245.

The social interaction component 650 is structured to present, to a user of a receiving account, an interaction that the interaction module 235 received from another interacting account. In one embodiment, the accounts presented in a social interaction component are based, at least in part, on directional connections between the receiving account and other accounts. For example, the user of the receiving account subscribes to the displayed accounts in the social interaction components 650. The interaction identifiers 655 include the profile image, user name, and account identifier of the interacting account. The prediction 660 indicates that interacting account's answer to the objective question. The user of the receiving account may select one or more reactions 665 to cheer with, commiserate with, or taunt the interacting account.

Computing Machine Architecture

Figure 7:
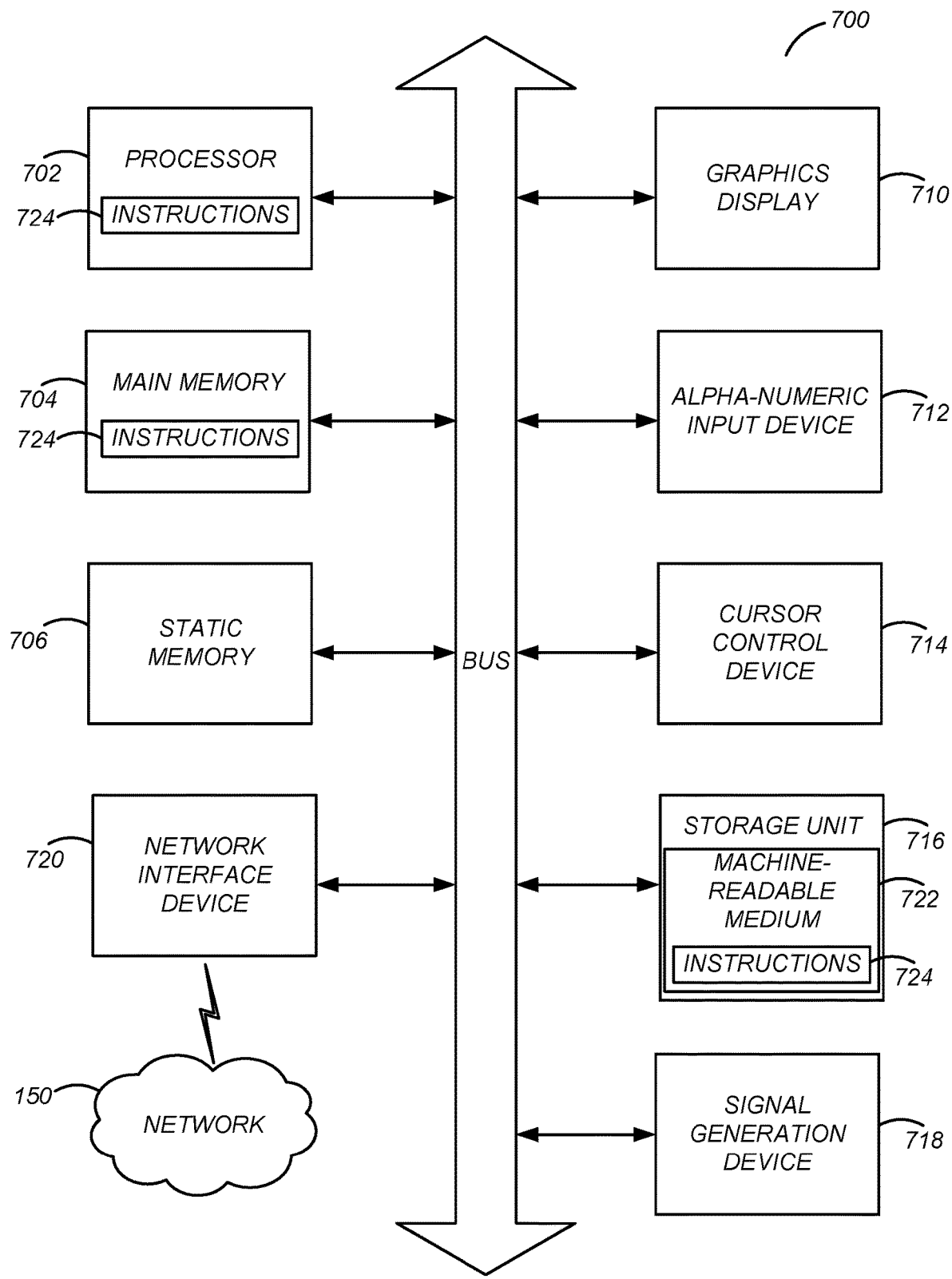
FIG. 7 illustrates one embodiment of components of an example machine able to read instructions from a machine-readable medium and execute them in a processor (or controller).

Referring now to FIG. 7, illustrated is a block diagram illustrating components of an example machine able to read instructions from a machine-readable medium and execute them in a processor (or controller). Specifically, FIG. 7 shows a diagrammatic representation of a machine in the example form of a computer system 700 within which instructions 724 (e.g., software or a computer program product) for causing the machine to perform any one or more of the methodologies discussed herein may be executed. The instructions 724 correspond to processes or functionality, as described in FIGS. 1-6D. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors 702 (generally, a processor 702) such as a central processing unit (CPU), a graphics processing unit (GPU), a digital signal processor (DSP), one or more application specific integrated circuits (ASICs), one or more radio-frequency integrated circuits (RFICs), or any combination of these, a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alpha-numeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708. The display unit 710 may be integrated with the alphanumeric input device 712 and/or cursor control device 714 (e.g., a touch screen display).

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

The example computer system 700 may be used to implement the client device 140, and the event moderator 130 may use an example computer system 700 to interface with the messaging platform 120. In one embodiment, the messaging platform 120 and the content source 110 are implemented on servers that include many of the components of the example computer system 700 but may omit components including the display unit 710, the alphanumeric input device 712, and/or the cursor control device 714.

Additional Configuration Considerations

The disclosed embodiments beneficially allow for creation of a SMCI about an event that remains relevant as the event progresses. By receiving event data substantially in real time, and by associating the received event data with a component of an interactive message's template, the interactive message presents content that updates substantially in real time with the event. The plurality of states in an interactive message provide for presentation of components that are relevant for the interactive message's focus given the development of the event. Interactive components provide a platform for a centralized community of accounts to interact and experience an event together. Interaction aggregations summarize interactions with the interactive message and can even provide a content source 110 with interaction data from a messaging environment (e.g., a social network environment, a publish-subscribe messaging environment). Interactive components that identify event data may be used to crowd source feature extraction from an event. The content source 110 receives feedback substantially in real time based on interaction aggregations and event data.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2 and 7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system of a social networking platform, comprising:
   one or more machines; and
   computer-readable storage device coupled to the one or more machines and having instructions stored thereon which, when executed by the one or more machines, cause the one or more machines to perform operations comprising:
   receiving, from a content source, event data of a media event, the event data including one or more of an image, a text, and numerical data associated with the media event;
   forming an interactive message based on the event data and according to a message template, wherein forming the interactive message includes associating the event data with one or more components of the message template;
   transmitting the interactive message to a plurality of client devices each associated with a respective one of a plurality of user accounts of the social networking platform, the interactive message being transmitted as a social media content item on the social networking platform, wherein the interactive message is transmitted to the plurality of client devices during a broadcast of the media event;
   receiving, from at least one client device of the plurality of client devices, a report of a first interaction with the interactive message by a first user, wherein the report indicates that the first user provided a first answer to a question presented in the interactive message;
   updating, based on the report, the interactive message to provide an updated interactive message that includes an indication of the first interaction received in the report, wherein the updated interactive message includes a component that indicates a number or a percentage of users of the plurality of users who have provided a same answer as the first answer; and
   transmitting the updated interactive message to the at least one client device.

2. The system of claim 1, wherein the operations further comprise:
   extracting one or more features from the media event by recognizing one or more of a face, an object, an audio, a speech, a text, numerical data, and meaningful breakpoints, in the media event; and
   identifying, from among the one or more features, at least one feature that indicates an update in the media event, wherein the interactive message is also updated in response to identifying the at least one feature.

3. The system of claim 2, wherein
   the operations further comprise comparing the first answer to the update in the media event to determine whether the first user answered the question correctly or incorrectly,
   wherein the updated interactive message includes a component that indicates whether the first user answered the question correctly or incorrectly.

4. The system of claim 1, wherein the operations further comprise identifying the plurality of user accounts from user accounts of the social networking platform, wherein a second user account of the plurality of user accounts is identified by determining that a user interest associated with the second user account on the social networking platform is relevant to a subject matter of the media event.

5. The system of claim 1, wherein the operations further comprise receiving, from a moderator account of the plurality of user accounts, a request to initiate the interactive message, the request comprising an identification of the media event and respective identifications of one or more user accounts in the plurality of user accounts.

6. The system of claim 1, wherein the operations further comprise receiving, from a moderator account of the plurality of user accounts, a request to initiate the interactive message, the request comprising an identification of the media event, wherein each of the plurality of user accounts has a unidirectional or a bidirectional connection with the moderator account on the social networking platform,
   wherein a unidirectional account between a user account and the moderator account indicates that the user account is subscribed to receive messages posted by the moderator account on the social networking platform, and
   wherein a bidirectional account between a user account and the moderator account indicates that the user account is subscribed to receive messages posted by the moderator account and the moderator account is subscribed to receive messages posted by the user account on the social networking platform.

7. The system of claim 1, wherein the operations further comprise:
   identifying a connection graph of a second user account of the plurality of user accounts to whom the interactive message is transmitted, the connection graph including an identification of a third user account that is connected to the second user account on the social networking platform, and in response:
sending the interactive message to the third user account.

8. The system of claim 1, wherein the report indicates that the first interaction with the interactive message includes a comment or a selection of an item presented on the interactive message, or a reaction to an interaction previously provided by a user on the interactive message.

9. A method performed by a social networking platform implemented on one or more computers, the method comprising:
receiving, from a content source, event data of a media event, the event data including one or more of an image, a text, and numerical data associated with the media event;
forming an interactive message based on the event data and according to a message template, wherein forming the interactive message includes associating the event data with one or more components of the message template;
transmitting the interactive message to a plurality of client devices each associated with a respective one of a plurality of user accounts of the social networking platform, the interactive message being transmitted as a social media content item on the social networking platform, wherein the interactive message is transmitted to the plurality of client devices during a broadcast of the media event;
receiving, from at least one client device of the plurality of client devices, a report of a first interaction with the interactive message by a first user, wherein the report indicates that the first user provided a first answer to a question presented in the interactive message;
updating, based on the report, the interactive message to provide an updated interactive message that includes an indication of the first interaction received in the report, wherein the updated interactive message includes a component that indicates a number or a percentage of user accounts in the plurality of user accounts who have provided a same answer as the first answer; and
transmitting the updated interactive message to the at least one client device.

10. The method of claim 9, further comprising:
extracting one or more features from the media event by recognizing one or more of a face, an object, an audio, a speech, a text, numerical data, and meaningful breakpoints, in the media event; and
identifying, from among the one or more features, at least one feature that indicates an update in the media event, wherein the interactive message is also updated in response to identifying the at least one feature.

11. The method of claim 10, further comprising comparing the first answer to the update in the media event to determine whether the first user answered the question correctly or incorrectly,
wherein the updated interactive message includes a component that indicates whether the first user answered the question correctly or incorrectly.

12. The method of claim 9, further comprising identifying the plurality of user accounts from user accounts of the social networking platform, wherein a second user account of the plurality of user accounts is identified by determining that a user interest associated with the second user account on the social networking platform is relevant to a subject matter of the media event.

13. The method of claim 9, further comprising:
identifying a connection graph of a second user account of the plurality of user accounts to whom the interactive message is transmitted, the connection graph including an identification of a third user account that is connected to the second user account on the social networking platform, and in response:
sending the interactive message to the third user account.

14. The method of claim 9, wherein the operations further comprise receiving, from a moderator account of the plurality of user accounts, a request to initiate the interactive message, the request comprising an identification of the media event and respective identifications of one or more user accounts in the plurality of user accounts.

15. The method of claim 9, further comprising receiving, from a moderator account of the plurality of user accounts, a request to initiate the interactive message, the request comprising an identification of the media event, wherein each of the plurality of user accounts has a unidirectional or a bidirectional connection with the moderator account on the social networking platform,
wherein a unidirectional account between a user account and the moderator account indicates that the user account is subscribed to receive messages posted by the moderator account on the social networking platform, and
wherein a bidirectional account between a user account and the moderator account indicates that the user account is subscribed to receive messages posted by the moderator account and the moderator account is subscribed to receive messages posted by the user account on the social networking platform.

16. The method of claim 9, wherein the report indicates that the first interaction with the interactive message includes a comment or a selection of an item on the interactive message, or a reaction to an interaction previously provided by a user on the interactive message.

17. One or more non-transitory, computer-readable storage media storing one or more instructions executable by a computer system of a social networking platform to perform operations comprising:
receiving, from a content source, event data of a media event, the event data including one or more of an image, a text, and numerical data associated with the media event;
forming an interactive message based on the event data and according to a message template, wherein forming the interactive message includes associating the event data with one or more components of the message template;
transmitting the interactive message to a plurality of client devices each associated with a respective one of a plurality of user accounts of the social networking platform, the interactive message being transmitted as a social media content item on the social networking platform, wherein the interactive message is transmitted to the plurality of client devices during a broadcast of the media event;
receiving, from at least one client device of the plurality of client devices, a report of a first interaction with the interactive message by a first user, wherein the report indicates that the first user provided a first answer to a question presented in the interactive message;
updating, based on the report, the interactive message to provide an updated interactive message that includes an indication of the first interaction received in the report, wherein the updated interactive message includes a component that indicates a number or a percentage of user accounts in the plurality of user accounts who have provided a same answer as the first answer; and transmitting the updated interactive message to the at least one client device.

18. The computer-readable storage media of claim 17, wherein the operations further comprise:

extracting one or more features from the media event by recognizing one or more of a face, an object, an audio, a speech, a text, numerical data, and meaningful breakpoints, in the media event; and identifying, from among the one or more features, at least one feature that indicates an update in the media event, wherein the interactive message is also updated in response to identifying the at least one feature.

19. The computer-readable storage media of claim 18, wherein the operations further comprise comparing the first answer to the update in the media event to determine whether the first user answered the question correctly or incorrectly, wherein the updated interactive message includes a component that indicates whether the first user answered the question correctly or incorrectly.

20. The computer-readable storage media of claim 17, wherein the operations further comprise identifying the plurality of user accounts from user accounts of the social networking platform, wherein a second user account of the plurality of user accounts is identified by determining that a user interest associated with the second user account on the social networking platform is relevant to a subject matter of the media event.

21. The computer-readable storage media of claim 17, wherein the operations further comprise receiving, from a moderator account of the plurality of user accounts, a request to initiate the interactive message, the request comprising an identification of the media event and respective identifications of one or more user accounts in the plurality of user accounts.

22. The computer-readable storage media of claim 17, wherein the operations further comprise receiving, from a moderator account of the plurality of user accounts, a request to initiate the interactive message, the request comprising an identification of the media event, wherein each of the plurality of user accounts has a unidirectional or a bidirectional connection with the moderator account on the social networking platform, wherein a unidirectional account between a user account and the moderator account indicates that the user account is subscribed to receive messages posted by the moderator account on the social networking platform, and wherein a bidirectional account between a user account and the moderator account indicates that the user account is subscribed to receive messages posted by the moderator account and the moderator account is subscribed to receive messages posted by the user account on the social networking platform.

23. The computer-readable storage media of claim 17, wherein the operations further comprise:

identifying a connection graph of a second user account of the plurality of user accounts to whom the interactive message is transmitted, the connection graph including an identification of a third user account that is connected to the second user account on the social networking platform, and in response:

sending the interactive message to the third user account.

24. The computer-readable storage media of claim 17, wherein the report indicates that the first interaction with the interactive message includes a comment or a selection of an item presented on the interactive message, or a reaction to an interaction previously provided by a user on the interactive message.

* * * * *